Figure 1:
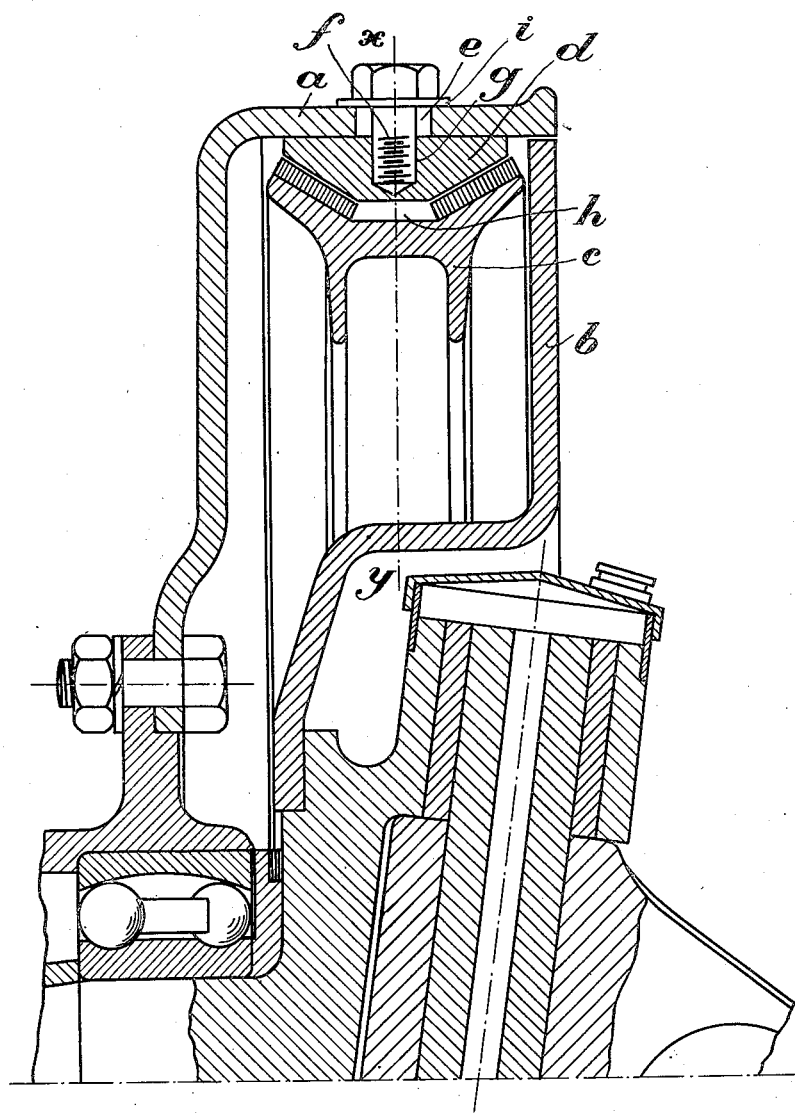

Nov. 14, 1933.  A. DE CONINCK  1,935,392
DEMOUNTABLE BRAKE APPARATUS
Filed Nov. 22, 1927    3 Sheets-Sheet 3

Inventor
Arthur De Coninck
By B. Singer Atty.

Patented Nov. 14, 1933

1,935,392

UNITED STATES PATENT OFFICE 1,935,392

DEMOUNTABLE BRAKE APPARATUS

Arthur De Coninck, Brussels-Uccle, Belgium, assignor to Bendix Brake Company, South Bend, Ind., a corporation of Illinois Application November 22, 1927, Serial No. 235,073, and in Belgium November 24, 1926

14 Claims. (Cl. 188—218)

Applications for patents have been made in the following countries: Belgium, November 24th, 1926, and France, December 7th, 1926.

In brakes generally and specially in internal expanding brakes for automotive vehicles, it is important to diminish the unit pressure as much as possible in order to avoid distortion of the drums.

In order to accomplish this the area of the rubbing surfaces is increased or, better yet, their braking effect is augmented. However, in brakes for automobile wheels, structural requirements necessitate reducing the diameter of the drums more and more and do not permit increasing the width of the latter.

For a given width of drum, the extent of the rubbing surfaces, can be increased by using corrugated surfaces, or preferably the braking effect can be increased without enlarging the area of the rubbing surfaces by providing the latter with angular or curved ribs and grooves, having a section such that each rib on one of the surfaces penetrates into corresponding groove on the other surface, producing a certain wedging action. However, in both cases the necessity of providing for the removal of the wheels and the brake drums has, up to the present, prevented the use of corrugated or ribbed rubbing surfaces, since such surfaces are constantly engaged in each other even when the brake is released, and therefore do not permit the drum to be practically and easily removed, whether it be solidly attached to the wheel or not.

In addition, up to the present it was impossible to obtain and to conserve practically the perfect axial fit between the grooves on one surface and the ribs on the other, which is indispensable in order to balance the lateral forces.

Moreover, when assembling the brakes it was also very difficult, if not impossible, to engage the corrugated or ribbed rubbing surface on the inside of the drum or braked member with the corresponding surface provided in the shoes, blocks or flexible band of the braking member.

The present invention aims to provide a brake in which the braked and braking surfaces are increased by corrugating or have their braking effect augmented by ribs and grooves, for the purpose of producing a wedging effect on each other. It also includes means rendering it possible to build a brake for automobile wheels or other vehicles, in which the rubbing surface area is increased by corrugating and the braking effect is augmented by wedging action, and may easily be engaged and disengaged.

According to the invention, the corrugated or ribbed and grooved friction lining is mounted inside the drum to form the braked surface, and is arranged so that it is possible to remove it easily from the drum or to disengage it from the surface of the braking members.

For example, the drum can be removed laterally, leaving its friction lining engaged with the lining on the shoes, blocks or other means transmitting the braking pressure.

If necessary, the friction lining mounted on the interior expansible shoes or blocks can also be arranged so that it is removable laterally.

In addition, the invention provides that the drum lining is not only removable from the drum, but also, when mounted on the latter, is capable of a certain lateral movement provided the attaching means are partially released, so that a perfect axial fit may be easily and readily obtained between the ribs on the drum lining and the grooves in the brake shoe lining, by simply tightening the brake shoes, after which the drum lining attaching means are tightened from outside in order to fix the said lining in place on the drum.

Moreover, in order to facilitate engaging the ribs on the annular drum lining with the brake shoe grooves, before mounting the drum lining on the drum, the invention provides that the brake drum rim, may be removed from the disc on which it is supported and, in addition, can be composed of two parts suitably assembled.

For the purpose of enabling the corrugated and ribbed brake drum lining to be removable laterally, the invention provides that holes or preferably, slots be provided in the drum rim parallel to the axis of the latter. Radial bolts with heads outside pass through the said slots so as to slide in the latter, and screw into corresponding threaded holes in the lining, holding it in place on the drum. If the bolts are slightly unscrewed, the said lining can move laterally in either direction on account of the bolts sliding in the slots, and the ribs can thus be brought to a perfect fit in the grooves in the brake shoe lining, or vice versa, after which the drum lining can be clamped in the proper position on the drum. If the said bolts are removed completely, the drum will no longer be attached to the drum lining and can be removed laterally, the lining remaining engaged on the brake shoe lining.

The invention provides that the lining of the drum or braked member, while being laterally removable, can be elastically abutted in each direction of its motion so that the lateral surfaces of its ribs which have an angular or other section, will come into contact progressively with the corresponding surfaces of the slightly eccentric grooves in the shoe lining.

The invention also provides the same lateral movement, elastically abutted in each direction, for the lining on the braking member or for the braking member itself.

By way of non-restrictive examples, the accompanying drawings show various forms of a brake having rubbing surfaces with single or multiple corrugations composed of ribs or grooves with angular sections so as to wedge progressively into each other when the brake is applied.

In these examples, the drum lining is removable and may be shifted laterally whether the flange is formed integral with the disc or not, and also when the rim may be removed from the disc and is made in two parts.

Fig. 1 is a vertical cross section of an internal expanding brake designed according to the invention and applied to a front wheel of an automobile.

Figure 2:
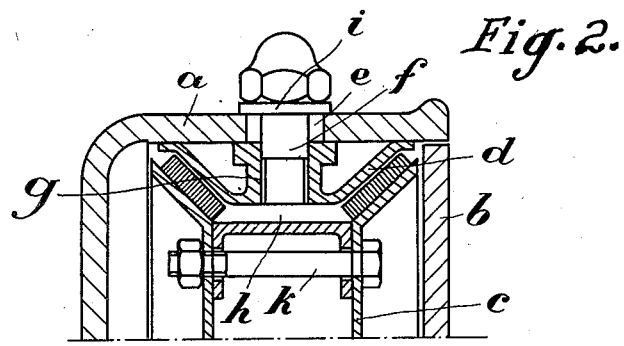
Figure 3:
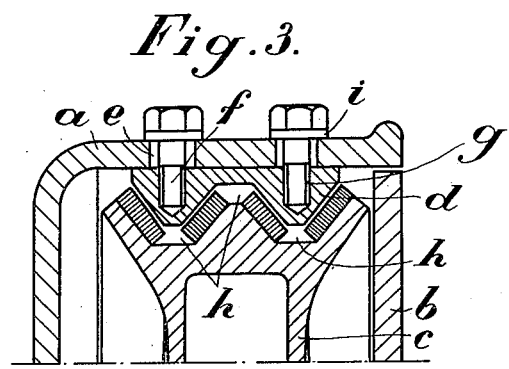
Figure 4:
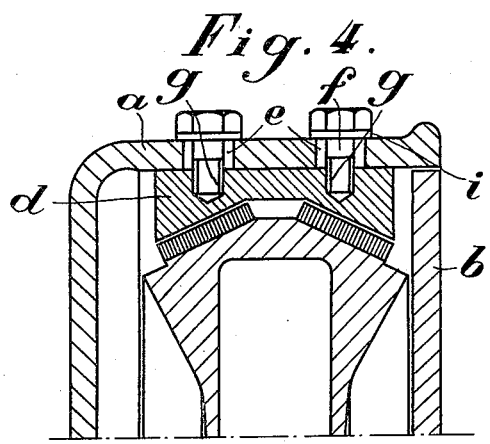

Figs. 2 to 4 inclusive show various alternative rubbing surfaces for such a brake.

Figure 5:
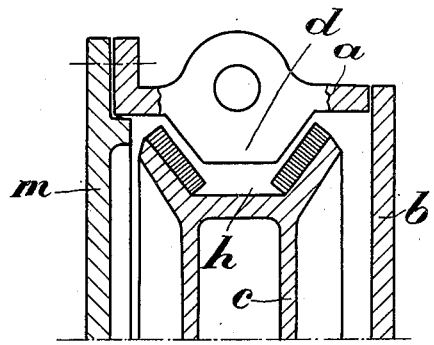
Figure 6:
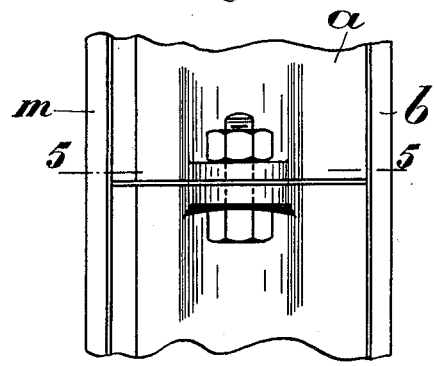

Fig. 5 shows a modification in which the drum rim is removable from the disc, and Fig. 6 shows a modification in which the drum rim is composed of two parts.

In Figs. 1 to 3, $a$ designates the rim of the brake drum, $b$ the plate supporting the brake mechanism, $c$ one of the internal brake shoes; $d$ wedge section ring forming the removable lining of the drum, $e$ one of the slots provided in the rim $a$ parallel to the geometrical axis $x\ y$ of the drum; $f$, a bolt passed from outside through the said slot and screwing into a threaded hole $g$ in the ring $d$.

The ring $d$ thus constitutes an annular rib applied and attached to the inner surface of the drum, and engaged in a groove $h$, the section of which is, if necessary, shaped with a smaller angle, and which is formed on the circumference of the inner brake shoes $c$. The sides of the said groove are preferably lined with ferrodo or analogous material.

The ring may moreover be composed of a single part, and if necessary at least one of the brake shoes $c$ can be made of two demountable halves placed together and assembled by bolts such as $k$, as shown in Fig. 2. The ribbed ring, may even be integral with the rim $a$ provided that the latter be removable from the disc $m$ and be composed of one or two superimposed parts as shown in Figs. 5 and 6.

When the ring $d$ is assembled around the shoes $c$, the latter having for example been introduced inside the ring, the rim $a$ is mounted laterally and the slots $e$ are brought opposite the threaded holes $g$. The bolts $f$ are then passed from the outside through the said slots and screwed into the holes $g$.

Before tightening the bolts completely, the shoes $c$ are moved towards the rim to cause the ring $d$ to penetrate completely into the groove $h$.

The ring $d$ can then be shifted laterally, the bolts sliding slightly in the slots, and when the axis of the rib coincides with that of the groove $h$, the ring is clamped in this position on the drum by screwing the bolts completely home.

Washers such as $i$, having preferably a curved bearing surface adapted to the cylindrical surface of the drum, are provided for covering the slots $e$ and thus preventing water, mud or dust from entering.

In order to remove the drum $a$, for renewing the friction surfaces or examining the brake mechanism, it is evidently only necessary to remove the bolts $f$.

Fig. 3 shows an example in which the annular drum lining forms two ribs $d$ with a groove between them, the brake shoe lining forming two grooves with a rib between them.

In Fig. 4 the drum lining forms a groove whereas the brake shoe lining forms a rib penetrating into the said groove, the drum lining being still attached to the drum by means of bolts passing through slots.

Both the drum lining and the brake shoe lining can be pressed sheet metal, as shown in Fig. 2, so that a relatively elastic rib and groove are formed.

The use of sheet metal enables light fluted or ribbed linings with several corrugations to be easily obtained by pressing or by rolling and bending, the holes for receiving the attaching bolts being punched in the sheet and then threaded.

As shown in Fig. 5, the rim $a$ of the drum can be flanged and removably attached to the disc $m$ by means of bolts. Moreover, it can be composed of two halves suitably assembled. (Fig. 6).

What I claim is:

1. A brake comprising a drum, a metal ring having ribs and a groove constituting the friction surface, means providing for axial adjustment of the ring on the inner periphery of the drum including means for securing the ring against displacement and brake shoes having corresponding ribs and grooves and constituting the friction surface adaptable for cooperation with the friction surface on the ring.

2. A brake comprising a drum having slots extending in the axial direction thereof, a metal ring in the drum having ribs and a groove constituting a friction surface therefor, tightening bolts extending through said slots and threaded into the ring and brake shoes having corresponding ribs and grooves constituting friction surfaces thereof adaptable for cooperation with the friction surfaces on the ring.

3. A brake comprising a drum, and a concentric liner therefor having an inclined braking surface.

4. A brake comprising a drum, and a removable concentric liner therefor having an inclined braking surface.

5. A brake comprising a drum, a concentric liner therefor, and means for detachably securing the liner against displacement said liner having an inclined braking surface.

6. A brake comprising a drum, a concentric liner therefor, and means providing for axial adjustment of the liner.

7. A brake comprising a drum, a concentric liner therefor, means providing for axial adjustment of the liner, and means for detachably securing the liner against displacement.

8. A brake comprising a drum, a concentric liner therefor, the drum having slots therein parallel to the axis thereof and bolts passing through the slots and threaded into the liner.

9. A brake comprising a drum, a concentric liner therefor, a plurality of braking surfaces on the inner face of the liner, and means providing for adjusting the liner axially.

10. A brake comprising a drum, a concentric liner therefor, a rib on the inner face of the liner, and means providing for axial adjustment of the liner.

11. A brake comprising a drum, a concentric liner therefor, oppositely arranged inclined braking surfaces on the inner face of the liner, and means providing for axial adjustment of the liner.

12. A brake comprising a drum, a liner therefor, a plurality of braking surfaces on the inner face of the liner, means providing for adjusting the liner axially, and a friction element having a plurality of faces cooperating with the braking surfaces on the liner.

13. A brake comprising a drum, a liner therefor, a converging braking surfaces on the liner, means providing for axial adjustment of the liner, and a friction element having faces complementary to the braking surfaces on the liner.

14. A brake comprising a drum, a liner therefor, converging braking surfaces on the liner, means providing for axial adjustment of the liner, including means providing for detachably securing the liner to the drum, and a friction element having faces complementary to the braking surfaces on the liner and adaptable for cooperation therewith.

ARTHUR DE CONINCK.